C. M. LOGAN.
ART OF MAKING RINGS FOR CUTTING RUBBER AND OTHER MATERIAL.
APPLICATION FILED JUNE 10, 1920.
1,407,470.
Patented Feb. 21, 1922.
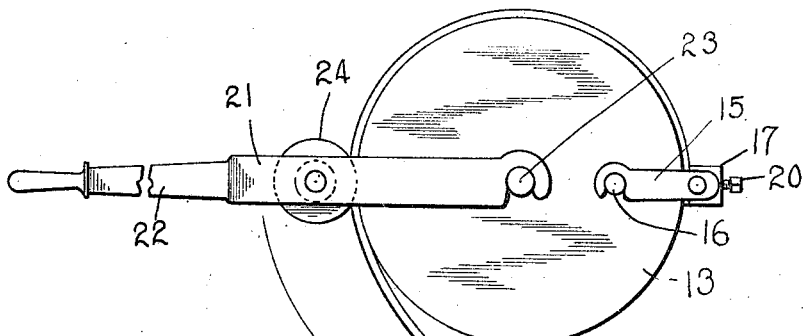
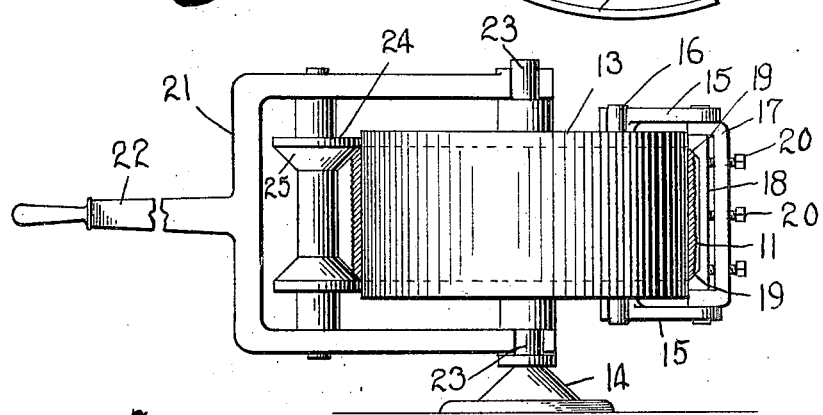
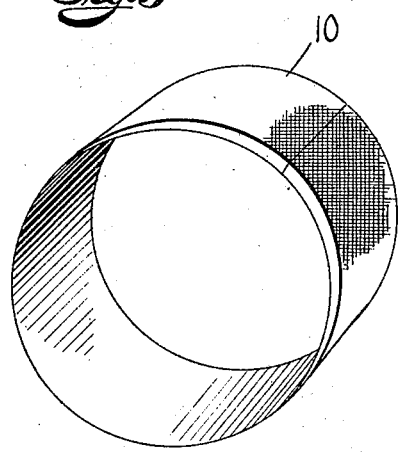
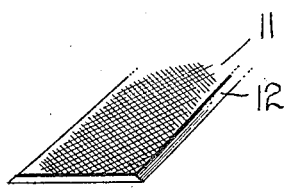
Colin M. Logan, Inventor,
By his Attorney,
W. P. Hutchinson.

UNITED STATES PATENT OFFICE.

COLIN M. LOGAN, OF NEWARK, NEW JERSEY, ASSIGNOR TO HELLER BROTHERS COMPANY, OF NEWARK, NEW JERSEY, A CORPORATION OF NEW JERSEY.

ART OF MAKING RINGS FOR CUTTING RUBBER AND OTHER MATERIAL.

1,407,470.  Specification of Letters Patent.  Patented Feb. 21, 1922.

Application filed June 10, 1920. Serial No. 387,899.

*To all whom it may concern:*

Be it known that I, COLIN M. LOGAN, a citizen of the United States, and a resident of the city of Newark, county of Essex, and State of New Jersey, have invented a new and useful Improvement in the Art of Making Rings for Cutting Rubber and other Material, of which the following is a full, clear, and exact description.

My invention relates to improvements in the art of forming cutting devices or mills in which rotary cutting cylinders or rings are used, which rings are provided with cutting, tearing, or lacerating surfaces to engage the rubber or other material and cut or tear it into shreds or the like. Rings of this kind are made of forged steel and are generally mounted on mandrils or other supports so as to turn in a mill or machine, and the material to be desiccated or cut up is held against its cutter. To this end the rings or cylinders have their cutting faces provided with teeth to engage the material to be shredded or cut, and because of the ring construction it has been found necessary to produce these teeth by hand, and they are generally made somewhat after the style of the teeth of a coarse rasp. The consequence is that rings of this character forged and then cut by hand are very expensive. On the other hand there are machines for cutting similar teeth on flat strips such as files, rasps, and the like, and I have found that by cutting a flat strip of forged steel on a conventional or other machine, or even by hand, and then shaping the flat piece into a ring, a great saving in the expense is effected. This is because first, of the saving in hand labor, and next, because a forged ring is more expensive than the flat strip of steel. In carrying out my invention along the above lines, I first take a piece of suitable flat steel and shape its edges so that it can be grasped by the edges to be bent without injuring the teeth subsequently formed thereon, then cut the surface of the strip so as to produce the necessary teeth. The strip is then grasped by the edges and bent around a former so as to give it the desired shape, and the ends are left in close abutment, and may if desired be welded electrically or otherwise. Thus it will be seen that I form a ring very expeditiously and economically which is to all intents as good as the ring formed from a steel forging, and with teeth subsequently cut thereon. All of which will be more clearly understood from the description which follows.

Reference is to be had to the accompanying drawings forming a part of this specification, in which similar reference characters indicate corresponding parts in all the views.

Figure 1 is a broken plan view of a simple means of bending the flat strip to the desired ring shape.

Figure 2 is a sectional side elevation of such a structure, both views showing the strip from which the ring is formed.

Figure 3 is a perspective view of the complete cutting ring, and

Figure 4 is a broken perspective of the strip of stock from which the ring is made.

The ring 10 is a conventional forged ring for the purpose stated, and it has its outer surface provided with teeth which as stated are of the same general kind as those on a coarse rasp. The strip 11 I have shown with beveled edges 12 so that after the teeth are formed thereon the strip can be gripped by the edges and bent to shape without injuring the teeth. A beveled edge serves this purpose perfectly, but it will be understood that so far as my invention is concerned the edges might be flanged or otherwise shaped, so long as they could be grasped with sufficient power to bend the material so as to make it unnecessary to apply pressure to the cutting face thereof.

In Figures 1 and 2 I have shown a somewhat crude but effective means of bending the strip 11 to shape, and it will be understood of course that the drawings merely illustrate a means of accomplishing this result, but so far as my invention is concerned, very many other devices might be used if desired, as the invention lies in the art of making the cutting rings and not in the means for making them. As shown, however, the structure has a former 13 of cylindrical shape about which the strip 11 is bent, and this is mounted on a base 14, but can be supported in any desired way or position. Fastening means is provided to secure the end of the strip 11 to the former, and this can be anything suitable. As illustrated a pair of arms 15 hook on over pins 16 on the ends of the former, and a cross piece 17 between the arms carries a movable block 18 which lies between the cross piece and the former, this block having a recessed middle portion, and having its inner end portions beveled as shown at 19 so as to engage the beveled edges 12 of the strip 11. The block can be forced up snugly against the former 13 by screws 20 which extend through the cross piece 17 and abut with the block, or other suitable means can be substituted.

For bending the strip 11 to shape a yoke 21 which is provided with a suitable lever or handle 22 can be used, and this is shaped to hook on over the members 23 at the ends of the former, which members are centrally located so that the yoke can be revolved around the former by swinging on the members 23. The yoke carries a roller 24 which is relieved in its middle section, and has beveled members 25 bearing against the beveled edges 12 of the strip 11. This structure affords a simple means of carrying out my method.

In practice the strip 11 of the right dimensions and with its edges 12 beveled or otherwise provided with means for engaging the bending device, is passed through a machine, and the teeth cut upon its face, or the teeth can be cut in any other preferred way, after which the strip is heated, one end fastened to the former as shown, and the bending device is then turned around so as to force the strip 11 firmly against the former 13 and wrap it around the same so that the two ends of the strip 11 shall come into close abutment. When the ring cools these ends will stay in position, but it is better to weld them together so that the ring may be solid. The ring itself is the conventional ring for the purpose stated, and I lay no claim to this, but my invention lies in the method of forming the ring. It will be understood that other means can be provided for securing the flat strip 11 to the former and bending it around the same, and for engaging the strip by its edges.

I claim:—

1. The improvement in the art of forming rings having cutting or abrading faces, which consists in first cutting the face of a flat strip of material, and then grasping the strip in a manner to leave the teeth uninjured and bending the material around a former to give it the desired shape.

2. The improvement in the art of forming a ring with a cutting or abrading face, which consists in first producing the cutting face upon a flat strip of material, then grasping the material by its edges and bending it round a forming device to give it the desired shape.

3. The improvement in the art of forming rings having cutting or abrading faces, which consists in first producing the cutting or abrading face upon a flat strip of material, next heating the material, grasping it in a manner which will not injure the teeth and bending it around a forming surface to give it the desired shape, and then securing the ends of the strip together.

4. The improvement in the art of producing rings having cutting or abrading faces, which consists in first shaping a flat strip of material so that it can be engaged by the edges, next producing a cutting or abrading face on said strip, next heating the strip, then securing it at one end to a former device, and finally engaging it by the edges and bending it around the forming device.

5. The improvement in the art of producing a ring having a cutting or abrading face, which consists in forming said cutting or abrading face upon a flat strip of material, heating said material, securing one end of the strip to a forming device, and then engaging the strip at the edges to leave the teeth uninjured and bending the strip around the forming device to give it shape.

COLIN M. LOGAN.

Witnesses:
CHAS. W. TEN EYCK,
ANNA W. IBACH.